United States Patent [19]
Wildhaber

[11] 3,818,796
[45] June 25, 1974

[54] CUTTING TEETH ON WORKPIECES
[75] Inventor: Ernest Wildhaber, Rochester, N.Y.
[73] Assignee: Bird Island, Inc., Boston, Mass.
[22] Filed: Apr. 9, 1973
[21] Appl. No.: 348,888

[52] U.S. Cl.............................. 90/3, 90/6, 74/457
[51] Int. Cl.......... B23f 1/06, B23f 5/20, B23f 9/08
[58] Field of Search...................................... 90/3, 6

[56] References Cited
UNITED STATES PATENTS
1,097,222  5/1914  Grannis.................................... 90/3
3,659,495  5/1972  Maker...................................... 90/3

Primary Examiner—Francis S. Husar

[57] ABSTRACT

Apparatus for producing teeth in a rotary member featuring a rotatable workpiece, a pair of rotatable cutters arranged to respectively cut the opposite surfaces of each tooth, and a drive train for rotating the cutters and workpiece in timed relation to each other and effecting relative feed motion between the cutters and workpiece axially of the workpiece, each cutter being mounted for angular adjustment about an axis perpendicular to and intersecting both the workpiece axis and the respective cutter axis.

12 Claims, 5 Drawing Figures

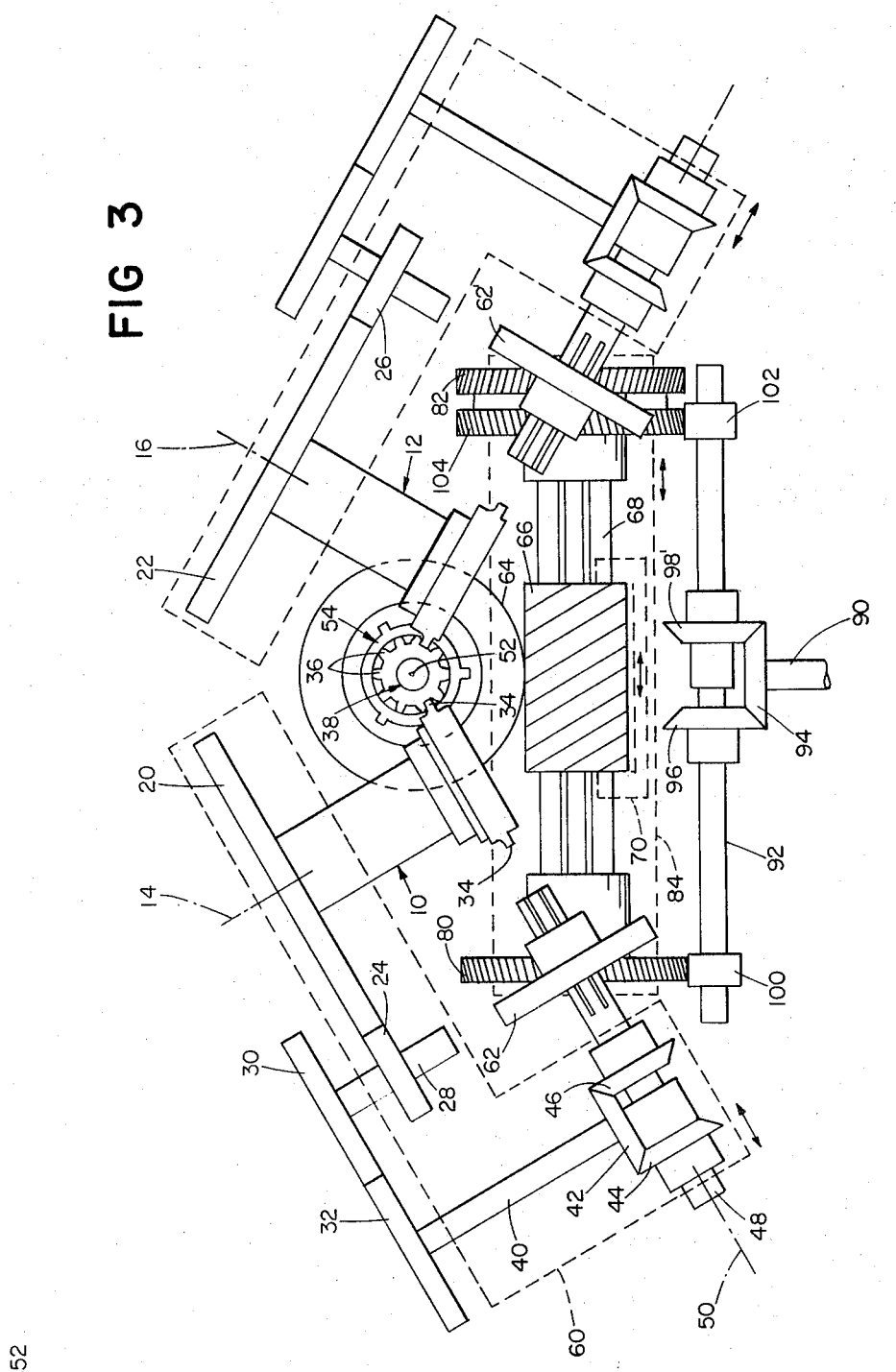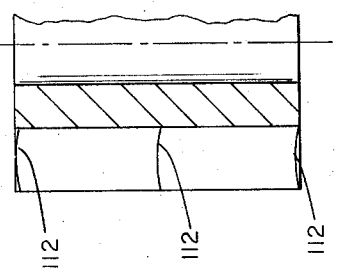

CUTTING TEETH ON WORKPIECES

BACKGROUND OF THE INVENTION

This invention relates to the production of teeth of gears or other rotary members, with rotating cutters operating on a rotating cylindrical workpiece while a feed motion axially of the workpiece is provided. Machines of the general sort involved are described in U.S. Pat. No. 3,662,650 and in a copending United States Patent Application entitled CUTTING TEETH ON WORKPIECES signed by Ernest Wildhaber on Mar. 16, 1973. The disclosures of said patent and application are hereby incorporated herein by reference. In general, these machines have cutting edges each adapted to cut the entire working depth of a tooth surface, from tip to fillet. Typically the facet produced by each cutting edge is inclined to a plane perpendiculrar to the workpiece axis, necessitating that the axially feed motion extend beyond the ends of the workpiece. Near the workpiece ends, as the facet length diminishes to zero, the cuts are progressively lighter and the machine load decreases. As the machine thus relaxes and returns to its unstressed state, some extra stock is removed, so that the tooth surface at the tooth ends departs somewhat from the true shape.

SUMMARY OF THE INVENTION

The invention provides an improved axial feed machine capable of rapid production of smooth, accurate surfaces. Roughing and finishing can be accomplished in a single operation (forward and reverse feeds), without requiring shaving to finish the tooth surfaces. The machine is highly adaptable to a variety of conditions of helix angle, longitudinal crowning, and workpiece diameter. Control is provided over the direction of facets produced by the cutters, overtravel during the axial feed is made unnecessary, and the tooth surfaces are true even at the tooth ends.

In general, the invention features, in one aspect, a rotatable workpiece, a pair of rotatable cutters arranged to respectively cut the opposite surfaces of each tooth, and a drive train for rotating the cutters and workpiece in timed relation to each other and effecting relative feed motion between the cutters and workpiece axially of the workpiece, each cutter being mounted for angular adjustment about an axis perpendicular to and intersecting both the workpiece axis and the respective cutter axis. In another aspect the invention features tilting of the cutter axis out of the plane perpendicular to the workpiece axis by an acute angle sufficient to cause the facets produced by the curved cutting edges of the cutter to lie approximately in planes perpendicular to the workpiece axis. In yet another aspect the invention features a cutter having a number of blades equal to the number of teeth to be cut in the workpiece, or to a small multiple (one to four times) of half the number of teeth. In yet another aspect the invention features the resulting gear having helical tooth surfaces composed of continuous facets extending across their entire working depth, the tooth surfaces having a mean helix angle of at least 15°, the facets each being tangent to a plane perpendicular to the gear axis at an intermediate point on the working depth. In preferred embodiments the workpiece is driven through a worm axially shiftable along its axis perpendicular to the workpiece axis in time with the axial feed of the workpiece; the cutters are driven through coaxial helical gears of opposite hand mounted on a slide movable at a controllable rate along the common axis of the helical gears to control cutter phase for crowning or set-off between roughing and finishing: and each cutter spindle is mounted on a cradle adjustable about and along said axis perpendicular to the cutter and work axes.

Other advantages and features of the invention will be apparent from the description of a preferred embodiment thereof, and from the drawings.

BRIEF DESCRIPTION OF THE DRAWINGS

FIGS. 1 and 2 are fragmentary views of workpiece teeth with selected facets produced by the cutters being shown;

FIG. 3 is a diagrammatic plan view looking along the axis of the work spindle, of apparatus embodying the invention;

DESCRIPTION OF THE PREFERRED EMBODIMENT

Figure 4:
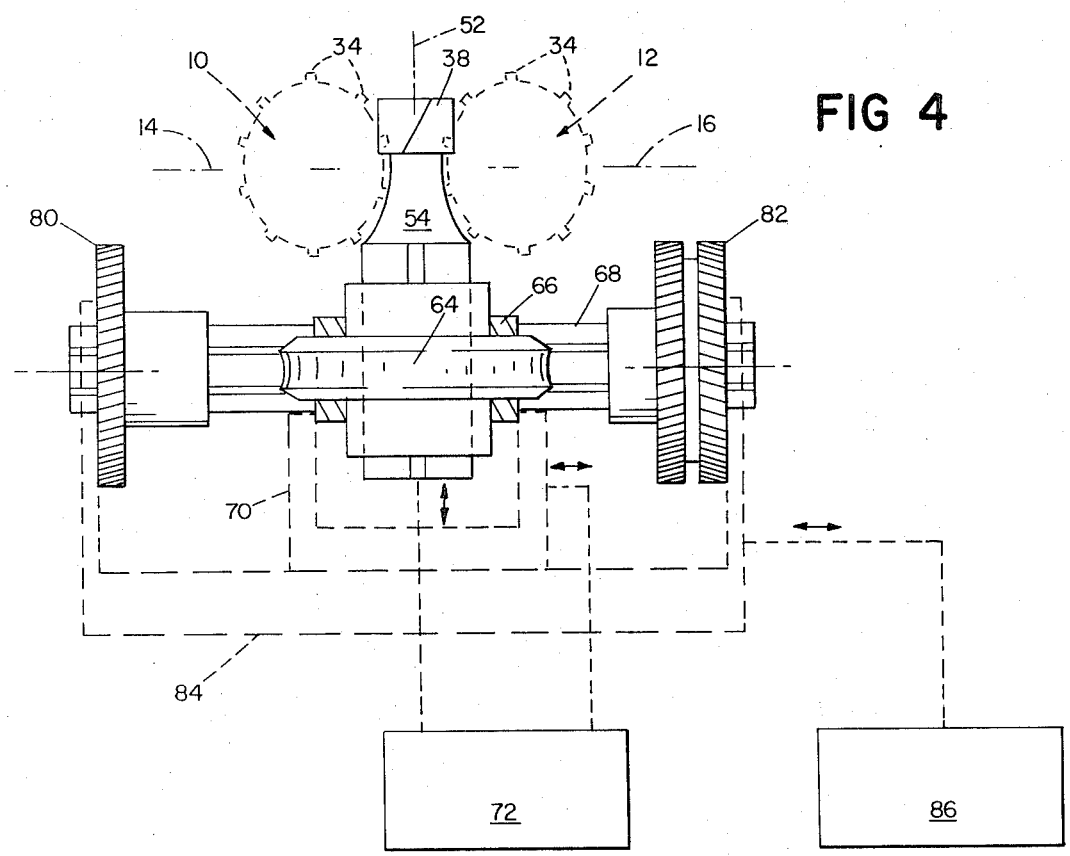
FIG. 4 is a fragmentary front view corresponding to FIG. 3.

Referring to FIGS. 3 and 4, cutter spindles 10 and 12 are mounted for rotation about axes 14 and 16. Each spindle carries a large helical gear 20, 22 in mesh with a pinion 24, 26. Pinion 24 is rigid with a shaft 28 that carries at its outer end a gear 30 meshing with a gear 32. Gears 30 and 32 are change gears and have equal tooth numbers when (as here) the cutter contains a number $N_c$ of finishing blades 34 equal to the number N of teeth 36 to be cut in the workpiece 38. Gear 32 is rigid with shaft 40 which carries a miter gear 42 at its opposite end. Miter gear 42 meshes with two miter gears 44, 46 which can be selectively coupled to their shaft 48 by conventional means. Axis 50 of shaft 48 intersects cutter axis 14 as well as axis 52 of work spindle 54 at right angles.

Axes 14 and 50, along with the axis of shaft 40, lie in a common plane. Spindle 10 and shafts 40 and 48 are mounted on a cradle 60 coaxial with shaft 48 for angular adjustment about axis 50. The cradle base is slidably mounted on the machine frame for lengthwise adjustment along axis 50. Shaft 48 has a plane engagement with the hub of a gear 62 that is axially fixed to the machine frame.

The gearing described thus far is duplicated for the other cutter.

Work spindle 54 is rotated by means of a wormgear 64 meshing with a helical worm 66. Gear 64 is splined to the work spindle to permit axial feed of the work spindle. Worm 66 is similarly splined to its shaft 68 and is axially (of shaft 68) rigid with slide 70 to permit axial feed of the worm in time with the axial feed of the work spindle. Known mechanical and hydraulic control means 72 (FIG. 4) is provided to effect the coordinated feeds just described. The feed direction determines the hand of the produced helical teeth.

Worm shaft 68 has its opposite ends splined into the hubs of gears 80 and 82 which are mounted on a common slide 84. Gears 80 and 82 have helical teeth of opposite hands and equal lead, and mesh with gears 62 and 62'. Hydraulic control 86 is arranged to feed slide 84 at a varying rate along the worm axis, to effect longitudinal crowning of the teeth being cut (the feed of slide 84 producing a change of pahse phase the two cutters and hence affecting tooth thickness). Slide 84 is also shifted slightly after completion of the forward axial feed of the work spindle (during which the teeth are roughed) so that additional stock will be removed during the return axial feed, finishing the tooth surfaces.

Drive is applied through shaft 90 which drives shaft 92 selectively through miter gears 94 and 96, or 94 and 98. Pinion 100, rigid with shaft 92 at one end, meshes with gear 80. Pinion 102, rigid with the opposite end of shaft 92, meshes with gear 104 rigid with gear 82. Gear 104 is identical with gear 80 while gear 82 has teeth of opposite hand, so that both gears 80 and 82 turn equally regardless of their axial displacement.

FIG. 1 illustrates typical facets 110 produced by the curved cutting edges of the cutter when the apparatus is operated with the plane of axes 14 and 50 perpendicular to work axis 52. Facets 110 are oblique to planes perpendicular to the work axis and require the axial feed overtravel illustrated by the dashed lines 110' shown in FIG. 1. For helical teeth where the mean helix angle is at least about 15°, the facets can be kept approximately in planes perpendicular to the work axis by adjusting cradle 60 so that axis 14 makes a small acute angle $i$ with a plane perpendicular to axis 52. More precisely, as shown in FIG. 2, facets 112 are tangent to planes perpendicular to the work axis, the tangency being at a mean point on the tooth profile.

Figure 5:
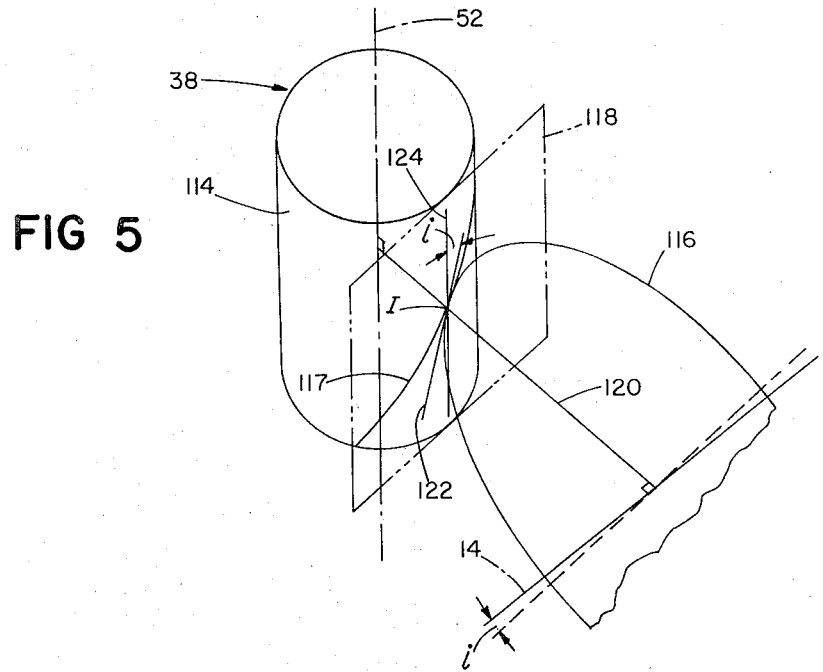
FIG. 5 is a diagram in perspective showing the relation of the cutter and work axes, and their respective pitch circle and cylinder.

The angle $i$ illustrated in FIG. 5 which shows in perspective the pitch surface 114 of the toothed member being cut from workpiece 38, in engagement with a cutter shown with its pitch circle 116. Circle 116 contacts the cylindrical pitch surface 114 at pitch point I. Helical pitch line 117 is shown passing through I. Plane 118 is tangent at I to the cylindrical pitch surface 114. Pitch horizontal 120 is perpendicular thereto. Work axis 52 and the cutter axis 14 both intersect pitch horizontal 120 at right angles.

Cutter pitch circle 116 extends in direction 122 at pitch point I, inclined at the angle $i$ to element 124 of the cylindrical pitch surface 114 and to axis 52. Likewise the cutter axis 14 includes the angle $i$ with a plane at right angles to work axis 52. Typically the angle $i$ will be smaller than 12°.

FIG. 5 relates to right hand helical teeth. The solutions for the opposite hands are symmetrical with respect to one another. It should be noted that the cutter path direction 122 includes a smaller angle with the tooth direction (the direction of helix 116) than element 124 of the cylindrical pitch surface.

The following approximate formula permits computation of the angle (90°−$i$) of the cutter axis with respect to the direction of the work axis, Herein $r$, $R_c$ are the pitch radii of the work and cutter respectively. $\phi$ is the normal pressure angle at the pitch point I, and $\chi$ the helix angle at I.

$\tan i = r/R_c + r \cos^2 \phi \cdot \tan \chi$

In an example $\phi = 20°$, $\chi = 25°$, $r/R_c + r = \frac{1}{4}$:
$i = 5°53'$ (approx.)

The exact figure is $i = 5°51'$.

The precise formula is $\tan i = \ctn \chi/2 \sin^2 \phi \, [-1 + \sqrt{1+Q}]$, where $Q = (2 \sin \phi \cos \phi \tan \chi)^2 \cdot r/R_c + r$.

The past tooth surface finish attainable calls for as many finishing blades or starts in the cutter as there are teeth in the workpiece. Then a tooth surface is cut always by the same blade. The same blade will produce the same cut over and over again in different feed positions. Finish requires a very high degree of identical repetition. On gears with large even tooth numbers we may also use a cutter with half the number of starts. The next best finish is attained when each tooth surface is cut with two finishing blades whose cuts alternate. This occurs when the number $N_c$ of starts is double the tooth number $n$ of the gear. It also occurs when $N_c$ is $1 \frac{1}{2} n$.

When starting from a given gear and a given number $N_c$ of starts on the cutter, an angle $i$ may be initially assumed, (for instance $i = 6°$). The corresponding pitch radius $R_c$ is then computed from the requirement that the normal pitch of the cutter equals the normal pitch of the helical teeth, as expressed by:

$R_c/r = N_c \cos \chi / n \sin (\chi - i)$, obtaining an initial $R_c$ with the assumed angle $i$.

closer angle $i$ is then computed with the formula for $\tan i$. A new $R_c/r$ is obtained from the above formula with this closer $i$. a still closer angle $i$ is now obtained with the formula for $\tan i$.

This may be repeated if necessary until the change of $\tan i$ is negligible, obtaining the final angle $i$ and with it the final $R_c$.

Other embodiments are within the following claims

What is claimed is:

1. Apparatus for cutting teeth on a workpiece, comprising a workpiece support rotatable about a work axis;

a pair of cutters respectively rotatable about cutters axes;

each said cutter having cutting edges arranged to make successive finish cuts each extending across the entire working depth of a tooth, said cutters being arranged to respectively cut the opposite surfaces of each tooth; and drive means for rotating said cutters and said workpiece in timed relation to each other and for effecting relative feed motion between said cutters and said workpiece axially of said workpiece;

each said cutter being mounted for angular adjustment about an axis perpendicular to and intersecting both said work axis and the respective said cutter axis.

2. The apparatus of claim 1 wherein said drive means includes a worm gear coaxial with said support and drivingly connected thereto, and a worm for driving said worm gear, said worm being axially shiftable along its axis perpendicular to said work axis, and means for feeding said worm along its axis in time with said relative feed motion between said cutters and said workpiece.

3. The apparatus of claim 1 wherein said drive means includes helical gears of opposite hand respectively positioned in driving relation with said cutters, said helical gears being mounted coaxially on a slide, and means for moving said slide at a controlled rate along the common axis of said helical gears to control cutter phase.

4. The apparatus of claim 3 wherein said rate is variable to produce crowning of said teeth.

5. The apparatus of claim 1 wherein each said cutter is mounted on a cradle adjustable about and along said axis perpendicular to said work and cutter axes.

6. Apparatus for cutting teeth on a workpiece, comprising a workpiece support rotatable about a work axis;
a pair of cutters respectively rotatable about cutter axes;
each said cutter having cutting edges arranged to make successive finish cuts each extending across the entire working depth of a tooth, said cutters being arranged to respectively cut the opposite surfaces of each tooth; and
drive means for rotating said cutters and said workpiece in timed relation to each other and for effecting relative feed position between said cutters and said workpiece axially of said workpiece;
each said cutter having a number of finish cutting edges $N_c$ equal to a multiple no greater than four of half the number of said teeth to be cut on said workpiece.

7. The apparatus of claim 6 wherein $N_c$ equals the number of said teeth to be cut on said workpiece.

8. Apparatus for cutting teeth on a workpiece, comprising
a workpiece support rotatable about a work axis;
a pair of cutters respectively rotatable about cutter axes;
each said cutter having cutting edges arranged to make successive finish cuts each extending across the entire working depth of a tooth, said cutters being arranged to respectively cut the opposite surfaces of each tooth; and
drive means for rotating said cutters and said workpiece in timed relation to each other and for effecting relative feed motion between said cutters and said workpiece axially of said workpiece;
each said cutter axis being tilted out of a plane perpendicular to said work axis by an acute angle sufficient to cause the facets produced by the respective cutter to approach perpendicular to said work axis.

9. The apparatus of claim 8 wherein said acute angle is sufficient to cause each said facet to be tangent to a plane perpendicular to said work axis at an intermediate point on said working depth of said tooth.

10. Apparatus for cutting helical teeth on a workpiece, comprising
a workpiece support rotatable about a work axis;
a cutter supported for rotation about a cutter axis;
said cutter having curved cutting edges arranged to make successive finish cuts extending across the entire working depth of a tooth; and
drive means for rotating said cutter and said workpiece in timed relation to each other and for effecting relative feed motion between said cutter and said workpiece axially of said workpiece;
the axis of said cutter being tilted out of a plane perpendicular to said work axis by an acute angle sufficient to cause the facets produced by the cutter to approach planes perpendicular to said work axis.

11. The apparatus of claim 10 wherein said acute angle is sufficient to cause each facet to be tangent to a plane perpendicular to said work at an intermediate point on said working depth of said tooth.

12. The apparatus of claim 10 wherein said acute angle is less than 12°.

* * * * *